(No Model.)

J. E. G. YALDEN.
SLIDE RULE.

No. 603,370.

Patented May 3, 1898.

Witnesses:
John Becker
William Miller

Inventor:
James E. G. Yalden
by his attorneys
Roeder & Briesen

UNITED STATES PATENT OFFICE.

JAMES E. G. YALDEN, OF NEW YORK, N. Y.

SLIDE-RULE.

SPECIFICATION forming part of Letters Patent No. 603,370, dated May 3, 1898.

Application filed March 2, 1898. Serial No. 672,255. (No model.)

*To all whom it may concern:*

Be it known that I, JAMES E. G. YALDEN, of New York city, county and State of New York, have invented an Improved Slide-Rule, of which the following is a specification.

This invention relates to a slide-rule of novel construction which possesses all the advantages of the ordinary form and in addition thereto permits the use of a much longer and more finely subdivided logarithmic scale than was heretofore possible for the same size of instrument. I propose to use in lieu of the heretofore-known straight scales—i. e., scales placed within a level plane—a pair of helical scales—i. e., scales formed on cylindrical helices and of which one is movable longitudinally and revolubly along the other. Thus the length of each scale exceeds greatly the length of the rule, and a much finer subdivision and more delicate reading may consequently be had.

Figure 2:
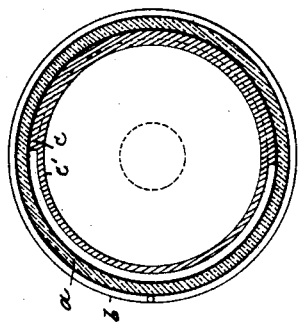
Figure 1:
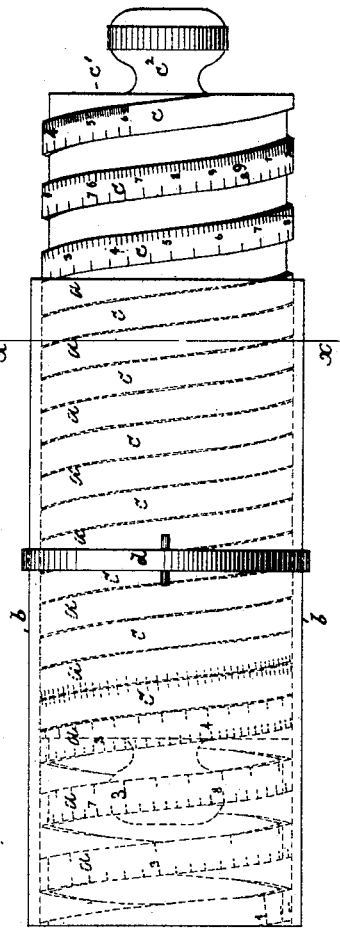
Figure 3:
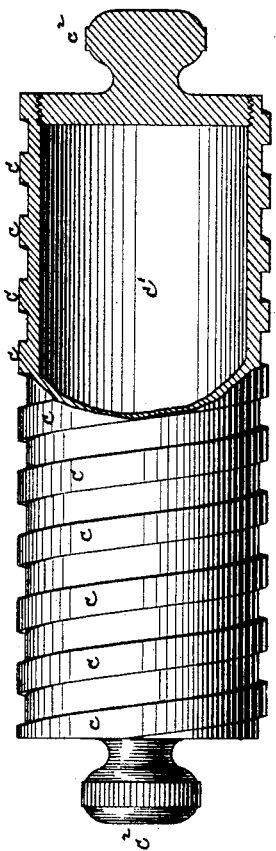
Figure 4:
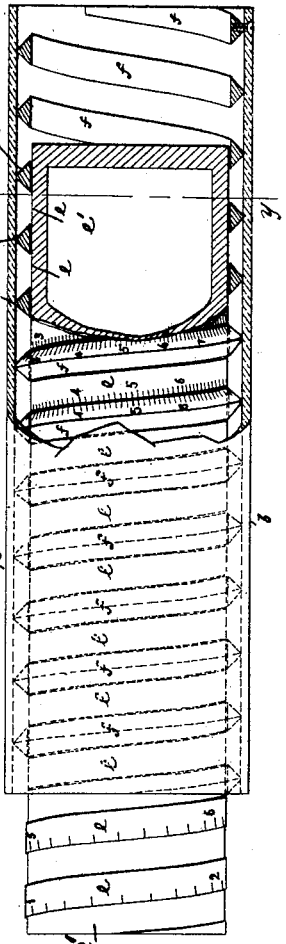

In the accompanying drawings, Figure 1 is a side elevation of one form of my improved slide-rule; Fig. 2, a cross-section on line $xx$, Fig. 1; Fig. 3, a longitudinal section, partly in elevation, of the inner core $c'$ of the rule. Fig. 4 is an elevation, partly in section, of a modification of the slide-rule; and Fig. 5, a cross-section on line $yy$, Fig. 4.

My improved slide-rule is composed, essentially, of two parts—viz., an outer body having a cylindrically-wound helix that carries a logarithmic scale or scales and an inner body having a cylindrically-wound helix that carries the corresponding scale or scales.

With the construction illustrated in Figs. 1 and 3 one of the scales is formed on a cylindrically-wound helical strip $a$ of metal or other material, which is secured to the inner face of a glass tube $b$, which forms a transparent case for the rule. The second scale is formed upon the thread $c$ of a cylindrical core or plug $c'$, which is embraced by the strip $a$ and has a longitudinal motion therein. The helices $a$ $c$ are of the same pitch and engage one another similar to a screw and nut and in such a manner as to form a common cylindrical surface, upon which the scales appear.

One scale should be formed along each edge of each of the helices, so that four scales in all are provided.

In use the glass cylinder $b$ is grasped with one hand, and the plug $c'$ is revolved to the left or right with the other hand by means of a handle $c^2$ until the proper division of the helix $a$ is brought into immediate conjunction with any division of the helix $c$, so that ratios and square roots can be read off at once. Thus it will be seen that with my invention a long logarithmic scale can be made in a compact form, which permits more figures to be accurately read and that the rule may be set with the greatest accuracy. The usual runner $d$ used with slide-rules should be made of circular form to embrace the tube $b$.

Figure 5:
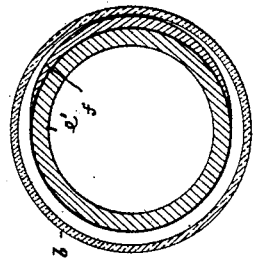

In Figs. 4 and 5 the threaded core $c'$ is replaced by a cylindrical core $e'$, upon the surface of which a helical scale $e$ is wound or marked. The second scale may be either formed by a helical strip $f$, secured to the inner face of the glass case $b$, or it may be directly wound or marked upon the body of such case. If the helical strip $f$ is employed, it should preferably be made of triangular shape in cross-section, as shown, so as to form two scale-carrying edges that are placed into a common cylindrical plane with the scales on the core $e'$. With this embodiment of the invention the rule is manipulated by sliding the core in and out of the tube to the proper extent and then revolving it until the scales are brought into conjunction, so that a very rapid reading may be effected.

It will be seen that in my rule the length of any one scale exceeds greatly that of the rule, so that with a rule of the ordinary portable length a very fine subdivision and an exact reading of several digits may be obtained.

What I claim is—

1. A slide-rule provided with two helices carrying scales, the threads of one helix being revoluble between the threads of the other helix, substantially as specified.

2. A slide-rule provided with two cylindrically-wound helices of like pitch carrying scales, the threads of one helix being revoluble between the threads of the other helix, so that one helix is movable along the other, substantially as specified.

3. A slide-rule composed of a transparent tube provided with a helical scale, and of a cylindrical core movable longitudinally within the tube and provided with a helical scale of like pitch, the threads of one helix being revoluble between the threads of the other helix, substantially as specified.

JAMES E. G. YALDEN.

Witnesses:
F. V. BRIESEN,
WILLIAM SCHULZ.